United States Patent [19]

Rhyne

[11] Patent Number: 5,230,340
[45] Date of Patent: Jul. 27, 1993

[54] ULTRASOUND IMAGING SYSTEM WITH IMPROVED DYNAMIC FOCUSING

[75] Inventor: Theodore L. Rhyne, Whitefish Bay, Wis.

[73] Assignee: General Electric Company, Milwaukee, Wis.

[21] Appl. No.: 867,597

[22] Filed: Apr. 13, 1992

[51] Int. Cl.⁵ ............................................. A61B 8/00
[52] U.S. Cl. .................................. 128/661.01; 73/625
[58] Field of Search ..................... 128/661.01, 660.07, 128/660.08; 73/625-626

[56] References Cited

U.S. PATENT DOCUMENTS

| | | | |
|---|---|---|---|
| 4,154,113 | 5/1979 | Engeler | 73/626 |
| 4,155,258 | 5/1979 | Engeler et al. | 73/626 |
| 4,155,259 | 5/1979 | Engeler | 73/626 |
| 4,155,260 | 5/1979 | Engeler et al. | 73/626 |
| 4,180,790 | 12/1979 | Thomas | 367/7 |
| 4,208,916 | 6/1980 | Thomenius et al. | 73/626 |
| 4,470,303 | 9/1984 | O'Donnell | 73/602 |
| 4,662,223 | 5/1987 | Riley et al. | 73/626 |
| 4,669,314 | 6/1987 | Magrane | 73/610 |
| 4,809,184 | 2/1989 | O'Donnell | 364/413.25 |
| 4,835,689 | 5/1989 | O'Donnell | 364/413.5 |
| 4,839,652 | 6/1989 | O'Donnell et al. | 341/122 |
| 4,974,211 | 11/1990 | Corl | 367/7 |
| 4,983,970 | 1/1991 | O'Donnell et al. | 341/122 |
| 5,172,343 | 12/1992 | O'Donnell | 128/661.01 X |

OTHER PUBLICATIONS

Leavitt, Steven C. et al, *A Scan Conversion Algorithm for Displaying Ultrasound Images,* Hewlett-Packard Journal, Oct. 1983, pp. 30-33.

*Primary Examiner*—Francis Jaworski
*Attorney, Agent, or Firm*—Quarles & Brady

[57] ABSTRACT

A PASS ultrasonic system includes a receive channel for each element in an ultrasonic transducer array which imparts a delay to the echo signal produced by each element. The delayed echo signals are summed to form a steered and dynamically focused receive beam. Each receive channel is formed as an integrated circuit. The integrated circuit calculates the required time delay for dynamic focussing in the receive channel as a function both of elapsed time in unit increments related to unit phase rotation increments of the carrier frequency and of previously calculated time delay values, in order to control a phase rotator and delay FIFO in the receive channel to implement echo signal delay control.

7 Claims, 6 Drawing Sheets

DISPLAY SYSTEM

RECEIVER CHANNEL

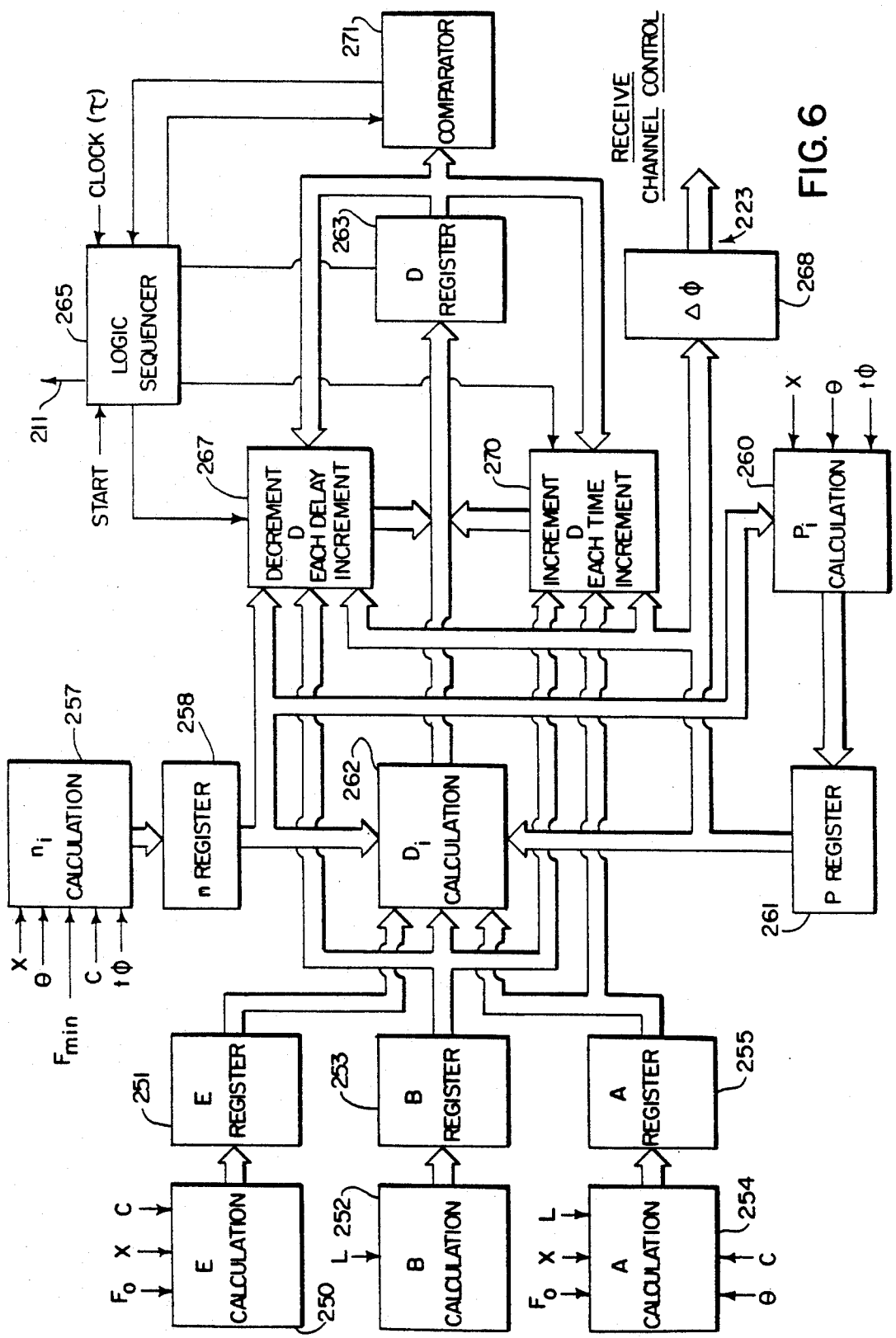

ULTRASOUND IMAGING SYSTEM WITH IMPROVED DYNAMIC FOCUSING

BACKGROUND OF THE INVENTION

The field of the invention is acoustical imaging and, in particular, an ultrasound imaging system with improved dynamic focusing.

There are a number of modes in which ultrasound can be used to produce images of objects. The ultrasound transmitter may be placed on one side of the object and the sound transmitted through the object to the ultrasound receiver placed on the other side ("transmission mode"). With transmission mode methods, an image may be produced in which the brightness of each pixel is a function of the amplitude of the ultrasound that reaches the receiver ("attenuation" mode), or the brightness of each pixel is a function of the time required for the sound to reach the receiver ("time-of-flight" or "speed of sound" mode). In the alternative, the receiver may be positioned on the same side of the object as the transmitter and an image may be produced in which the brightness of each pixel is a function of the amplitude at the time-of-flight of the ultrasound reflected from the object back to the receiver ("refraction", "backscatter" or "echo" mode). The present invention relates to a backscatter method for producing ultrasound images.

There are a number of well known backscatter methods for acquiring ultrasound data. In the so-called "A-scan" method, an ultrasound pulse is directed into the object by the transducer and the amplitude of the reflected sound is recorded over a period of time. The amplitude of the echo signal is proportional to the scattering strength of the refractors in the object and the time delay is proportional to the range of the refractors from the transducer. In the so-called "B-scan" method, the transducer transmits a series of ultrasonic pulses as it is scanned across the object along a single axis of motion. The resulting echo signals are recorded as with the A-scan method and their amplitude is used to modulate the brightness of pixels on a display at the time delay. With the B-scan method, enough data are acquired from which an image of the refractors can be reconstructed.

In the so-called C-scan method, the transducer is scanned across a plane above the object and only the echoes reflecting from the focal depth of the transducer are recorded. The sweep of the electron beam of a CRT display is synchronized to the scanning of the transducer so that the x and y coordinates of the transducer correspond to the x and y coordinates of the image.

Ultrasonic transducers for medical applications are constructed from one or more piezoelectric elements sandwiched between a pair of electrodes. Such piezoelectric elements are typically constructed of lead zirconate titanate (PZT), polyvinylidene diflouride (PVDF), or PZT ceramic/polymer composite. The electrodes are connected to a voltage source, and when a voltage waveform is applied, the piezoelectric elements change in size at a frequency corresponding to that of the applied voltage. When a voltage waveform is applied, the piezoelectric element emits an ultrasonic wave into the media to which it is coupled at the frequencies contained in the excitation waveform. Conversely, when an ultrasonic wave strikes the piezoelectric element, the element produces a corresponding voltage across its electrodes. Typically, the front of the element is covered with an acoustic matching layer that improves the coupling with the media in which the ultrasonic waves propagate. In addition, a backing material is coupled to the rear of the piezoelectric element to absorb ultrasonic waves that emerge from the back side of the element so that they do not interfere. A number of such ultrasonic transducer constructions are disclosed in U.S. Pat. Nos. 4,217,684; 4,425,525; 4,441,503; 4,470,305 and 4,569,231.

When used for ultrasound imaging, the transducer typically has a number of piezoelectric elements arranged in an array and driven with separate voltages (apodizing). By controlling the time delay (or phase) and amplitude of the applied voltages, the ultrasonic waves produced by the piezoelectric elements (transmission mode) combine to produce a net ultrasonic wave that travels along a preferred beam direction and is focused at a selected point along the beam. By controlling the time delay and amplitude of the applied voltages, the beam with its focal point can be moved in a plane to scan the subject.

The same principles apply when the transducer is employed to receive the reflected sound (receiver mode). That is, the voltages produced at the transducer elements in the array are summed together such that the net signal is indicative of the sound reflected from a single focal point in the subject. As with the transmission mode, this focused reception of the ultrasonic energy is achieved by imparting separate time delay (and-/or phase shifts) and gains to the signal from each transducer array element.

This form of ultrasonic imaging is referred to as "phased array sector scanning", or "PASS". Such a scan is comprised of a series of measurements in which the steered ultrasonic wave is transmitted, the system switches to receive mode after a short time interval, and the reflected ultrasonic wave is received and stored. Typically, the transmission and reception are steered in the same direction ($\theta$) during each measurement to acquire data from a series of points along an acoustic beam or scan line. The receiver is dynamically focused at a succession of ranges (R) along the scan line as the reflected ultrasonic waves are received. The time required to conduct the entire scan is a function of the time required to make each measurement and the number of measurements required to cover the entire region of interest at the desired resolution and signal-to-noise ratio. For example, a total of 128 scan lines may be acquired over a 90 degree sector, with each scan line being steered in increments of 0.70°. A number of such ultrasonic imaging systems are disclosed in U.S. Pat. Nos. 4,155,258; 4,155,260; 4,154,113; 4,155,259; 4,180,790; 4,470,303; 4,662,223; 4,669,314 and 4,809,184.

The time delay and phase shift applied to the signal received by each transducer array element in order to produce a perfectly steered and focused receive beam changes as the reflected ultrasonic wave is being received. This requires a receiver which is capable of calculating the desired time delay and phase shift for each array element signal in real time. While the calculations necessary to produce a perfectly focused receive beam have long been known, commercially feasible apparatus for performing these calculations has not been available. As a result, in prior PASS ultrasound systems the necessary dynamic focusing calculations have been approximated in order that they may be performed by available hardware. Consequently, the receive beams have not been completely focused and image quality has been impaired.

SUMMARY OF THE INVENTION

The present invention is an improved method and apparatus for dynamically focusing a receive beam in a PASS ultrasonic system. More specifically, the present invention includes a multi-element ultrasonic transducer; a transmitter which applies pulsed waveforms to the separate transducer elements delayed by amounts necessary to steer an ultrasonic beam in a desired direction ($\theta$); a receiver which connects to each transducer element and which provides separate delay and/or phase rotation to the echo signal produced by each transducer element to form a receive beam which is steered in the desired direction ($\theta$) and which is dynamically focused; a display system which employs the receive beam to produce an image; and in which the receiver includes a receive channel control that calculates the separate delays and/or phase rotation provided to each transducer element echo signal by calculating a value D according to the expression:

$$D = nA - npB - E^2 + p^2$$

where n is the number of time increments since the ultrasonic beam was transmitted, p is the number of delay increments applied to the echo signal and A, B and E to a constants; and comparing the value D to a preestablished value as n increases during the receipt of the echo signal and incrementing p to change the delay imposed on said echo signal when the value D exceeds the preestablished value. The manner in which the delay is imposed is a function of the receive channel architecture, and may, for example, involve changing the length of a time delay fifo memory or incrementing the phase delay imposed by a phase rotator, or both.

A general object of the invention is to provide the delays and phase rotation to each transducer element echo signal which will enable the receive beam to be accurately steered and focused. The calculations performed by the receive channel control produce a delay and/or phase rotation to each echo signal which precisely steers and dynamically focuses the receive beam in accordance with the formula:

$$T_d = t/2 - \sqrt{(t/2)^2 + (x/c)^2 - (xt/c)\sin(\theta)}$$

where:
Td = the delay for a transducer element located x distance from the center of the transducer array;
c = speed of sound in the subject;
t = elapsed time since ultrasonic wave was transmitted; and
$\theta$ = angle at which beam is steered.

Another general object of the invention is to provide a receive channel control which can calculate the echo signal delays in real time and which is commercially practical to manufacture. While the above formula for $T_d$ is very accurate, it cannot be calculated by commercially practical means. However, this formula can effectively be calculated in real time by converting it to a form in which calculations can be formed digitally using integer math functions.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 6 is an electrical block diagram of a receive channel control which forms part of the receiver channel of FIG. 5.

DESCRIPTION OF THE PREFERRED EMBODIMENT

Figure 1:
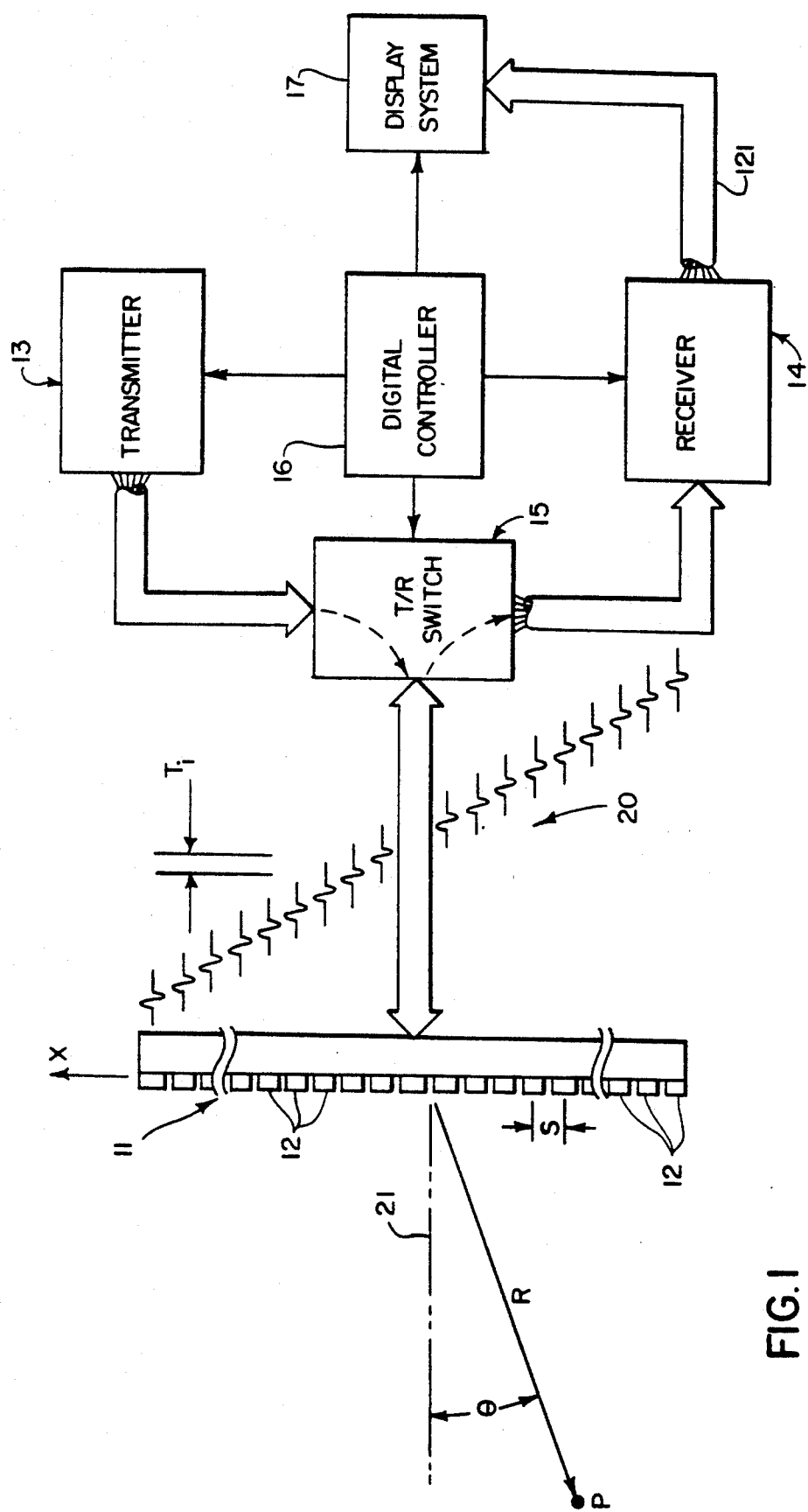
FIG. 1 is a block diagram of an ultrasonic imaging system which employs the present invention.

Referring particularly to FIG. 1, an ultrasonic imaging system includes a transducer array 11 comprised of a plurality of separately driven elements 12 which each produce a burst of ultrasonic energy when energized by a pulsed waveform produced by a transmitter 13. The ultrasonic energy reflected back to the transducer array 11 from the subject under study is converted to an electrical signal by each transducer element 12 and applied separately to a receiver 14 through a set of transmit-/receive (T/R) switches 15. The transmitter 13, receiver 14 and the switches 15 are operated under the control of a digital controller 16 responsive to the commands input by the human operator. A complete scan is performed by acquiring a series of echoes in which the switches 15 are set to their transmit position, the transmitter 13 is gated on momentarily to energize each transducer element 12, the switches 15 are then set to their receive position, and the subsequent echo signals produced by each transducer element 12 are applied to the receiver 14. The separate echo signals from each transducer element 12 are combined in the receiver 14 to produce a single echo signal which is employed to produce a line in an image on a display system 17.

The transmitter 13 drives the transducer array 11 such that the ultrasonic energy produced is directed, or steered, in a beam. A B-scan can therefore be performed by moving this beam through a set of angles from point-to-point rather than physically moving the transducer array 11. To accomplish this the transmitter 13 imparts a time delay ($T_i$) to the respective pulsed waveforms 20 that are applied to successive transducer elements 12. If the time delay is zero ($T_i = 0$), all the transducer elements 12 are energized simultaneously and the resulting ultrasonic beam is directed along an axis 21 normal to the transducer face and originating from the center of the transducer array 11. As the time delay ($T_i$) is increased as illustrated in FIG. 1, the ultrasonic beam is directed downward from the central axis 21 by an angle $\theta$. The relationship between the time delay increment $T_i$ added successively to each $i^{th}$ signal from one end of the transducer array (i=1) to the other end (i=n) is given by the following relationship:

$$T_i = R_T/c - \sqrt{(R_T/c)^2 + (x/c)^2 + xR_T\sin\theta/c} \quad (1)$$

where:
- x = distance of center of element i from center of transducer array,
- θ = transmit beam angle,
- c = velocity of sound in the object under study, and
- $R_T$ = range at which transmit beam is focused.

The time delays $T_i$ in equation (1) have the effect of steering the beam in the desired angle θ, and causing it to be focused at a fixed range $R_T$. A sector scan is performed by progressively changing the time delays $T_i$ in successive excitations. The angle θ is thus changed in increments to steer the transmitted beam in a succession of directions. When the direction of the beam is above the central axis 21, the timing of the pulses 20 is reversed, but the formula of equation (1) still applies.

Referring still to FIG. 1, the echo signals produced by each burst of ultrasonic energy emanate from reflecting objects located at successive positions (R) along the ultrasonic beam. These are sensed separately by each segment 12 of the transducer array 11 and a sample of the magnitude of the echo signal at a particular point in time represents the amount of reflection occurring at a specific range (R). Due to the differences in the propagation paths between a reflecting point P and each transducer element 12, however, these echo signals will not occur simultaneously and their amplitudes will not be equal. The function of the receiver 14 is to amplify and demodulate these separate echo signals, impart the proper time delay and phase shift to each and sum them together to provide a single echo signal which accurately indicates the total ultrasonic energy reflected from point P located at range R along the ultrasonic beam oriented at the angle θ.

To simultaneously sum the electrical signals produced by the echoes from each transducer element 12, time delays and phase shifts are introduced into each separate transducer element channel of the receiver 14. The beam time delays for reception are the same delays ($T_i$) as the transmission delays described above. However, in order to dynamically focus, the time delay and phase shift of each receiver channel is continuously changing during reception of the echo to provide dynamic focusing of the received beam at the range R from which the echo signal emanates. The exact equation for the time delay imposed on the signal received by each transducer element is as follows:

$$T_d = t/2 - \sqrt{(t/2)^2 + (x/c)^2 - (xt/c)\sin(\theta)} \quad (2)$$

where:
- t = elapsed time since sound transmitted from center of transducer array (i.e. START),
- c = the velocity of sound in the object under study,
- θ = beam angle, and
- x = distance of center of element from center of transducer array.

The same calculation, suitably scaled, also provides the correct phase shift.

Under the direction of the digital controller 16, the receiver 14 provides delays during the scan such that the steering of the receiver 14 tracks with the direction of the beam steered by the transmitter 13 and it samples the echo signals at a succession of ranges and provides the proper delays and phase shifts to dynamically focus at points P along the beam. Thus, each emission of an ultrasonic pulse waveform results in the acquisition of a series of data points which represent the amount of reflected sound from a corresponding series of points P located along the ultrasonic beam.

The display system 17 receives the series of data points produced by the receiver 14 and converts the data to a form producing the desired image. For example, if an A-scan is desired, the magnitude of the series of data points is merely graphed as a function of time. If a B-scan is desired, each data point in the series is used to control the brightness of a pixel in the image, and a scan comprised of a series of measurements at successive steering angles (θ) is performed to provide the data necessary for display.

Figure 2:
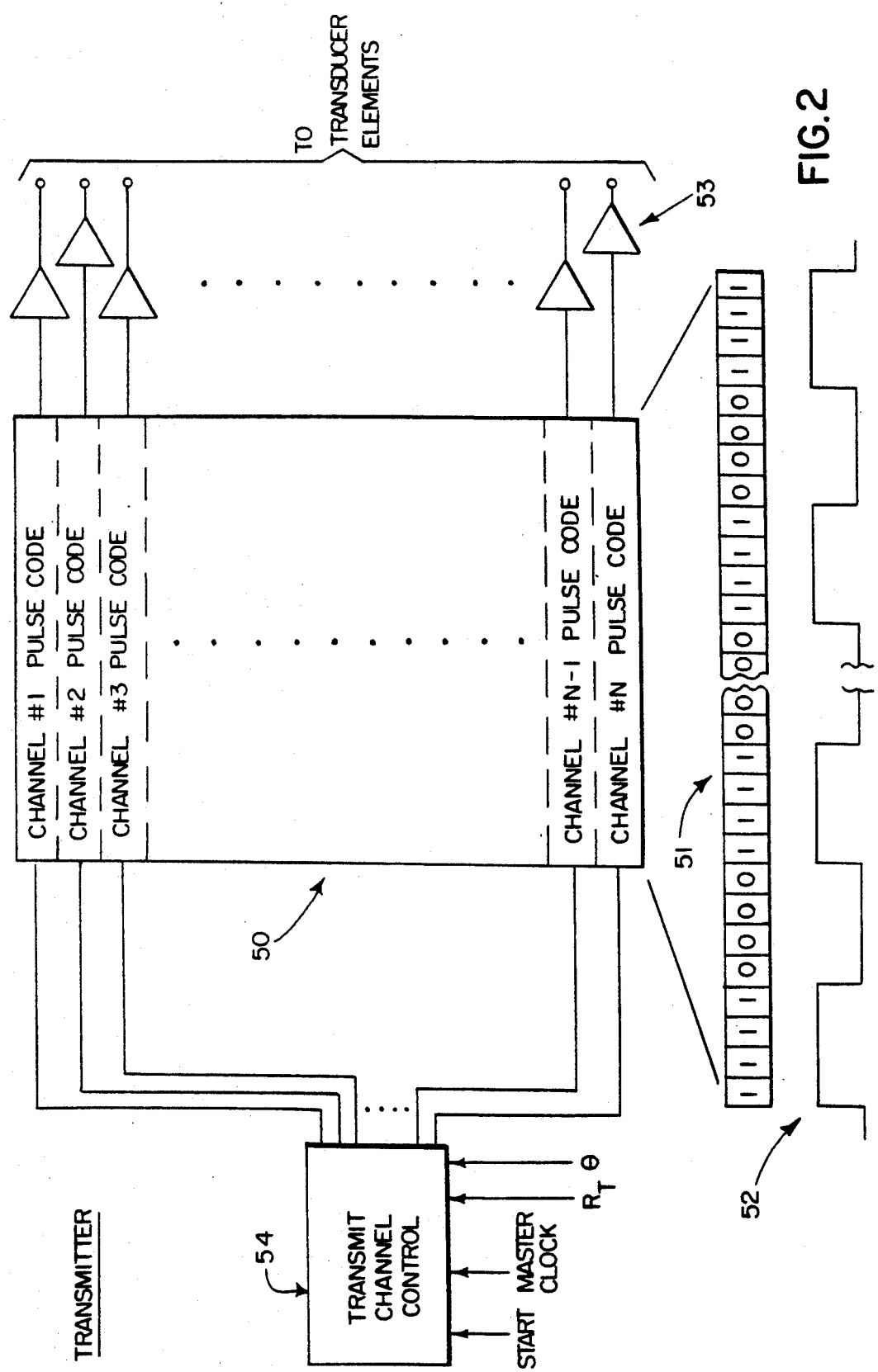
FIG. 2 is a block diagram of a transmitter which forms part of the system of FIG. 1.

Referring particularly to FIG. 2, the transmitter 13 includes a set of channel pulse code memories which are indicated collectively at 50. In the preferred embodiment there are 128 separate transducer elements 12, and therefore, there are 128 separate channel pulse code memories 50. Each pulse code memory 50 is typically a 1-bit by 512-bit memory which stores a bit pattern 51 that determines the frequency of the ultrasonic pulse 52 that is to be produced. In the preferred embodiment this bit pattern is read out of each pulse code memory 50 by a 40 MHz master clock and applied to a driver 53 which amplifies the signal to a power level suitable for driving the transducer 11. In the example shown in FIG. 2, the bit pattern is a sequence of four "1" bits alternated with four "0" bits to produce a 5 MHz ultrasonic pulse 52, however, other carrier frequencies ($F_0$) are employed in the preferred embodiment, such as 2.5, 3.75, 6.25, 7.5, 8.75 and 10 MHz. The transducer elements 11 to which these ultrasonic pulses 52 are applied respond by producing ultrasonic energy. If all 512 bits are used, a pulse of bandwidth as narrow as 40 kHz centered on the carrier frequency (i.e. 5 MHz in the example) will be emitted.

As indicated above, to steer the transmitted beam of the ultrasonic energy in the desired direction (θ), the pulses 52 for each of the n channels must be delayed by the proper amount. These delays are provided by a transmit control 54 which receives four control signals (START, MASTER CLOCK, $R_T$ and θ) from the digital controller 16 (FIG. 1). Using the input control signal θ, the fixed transmit focus $R_T$, and the above equation (1), the transmit control 54 calculates the delay increment $T_i$ required between successive transmit channels. When the START control signal is received, the transmit control 54 gates one of four possible phases of the 40 MHz MASTER CLOCK signal through to the first transmit channel 50. At each successive delay time interval ($T_i$) thereafter, the 40 MHz MASTER CLOCK signal is gated through to the next channel pulse code memory 50 until all n=128 channels are producing their ultrasonic pulses 52. Each transmit channel 50 is reset after its entire bit pattern 51 has been transmitted and the transmitter 13 then waits for the next θ and next START control signals from the digital controller 16. As indicated above, in the preferred embodiment of the invention a complete B-scan is comprised of 128 ultrasonic pulses steered in Δθ increments of 0.70° through a 90° sector centered about the central axis 21 (FIG. 1) of the transducer 11.

For a detailed description of the transmitter 13, reference is made to U.S. Pat. No. 5,014,712 issued on May 14, 1991 and entitled "Coded Excitation For Transmission Dynamic Focusing of Vibratory Energy Beam", incorporated herein by reference.

Figure 3:
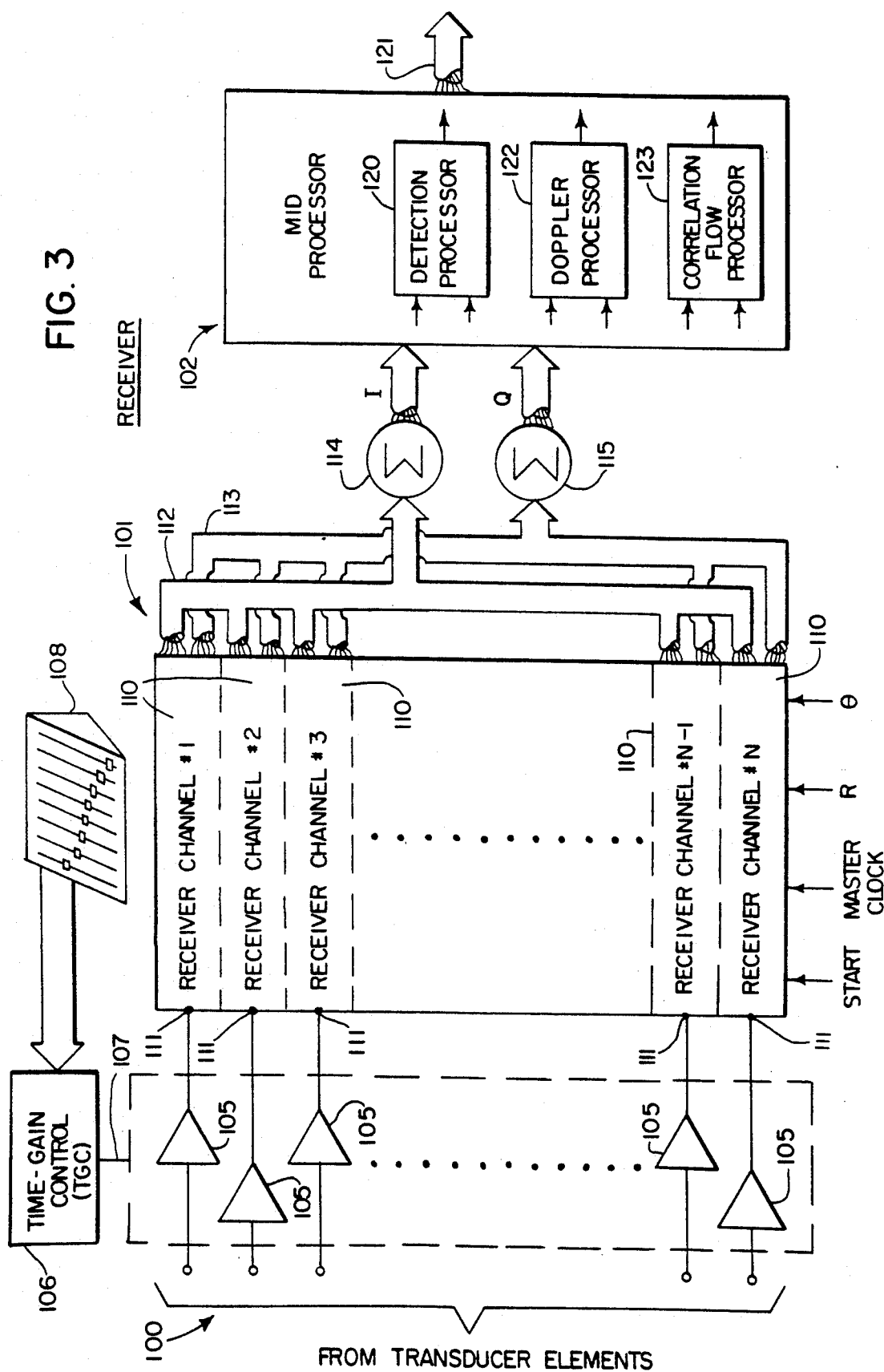
FIG. 3 is a block diagram of a receiver which forms part of the system of FIG. 1.

Referring particularly to FIG. 3, the receiver 14 is comprised of three sections: a time-gain control section 100, a beam forming section 101, and a mid processor 102. The time-gain control section 100 includes an amplifier 105 for each of the n=128 receiver channels and a time-gain control circuit 106. The input of each amplifier 105 is connected to a respective one of the transducer elements 12 to receive and amplify the echo signal which it receives. The amount of amplification provided by the amplifiers 105 is controlled through a control line 107 that is driven by the time-gain control circuit 106. As is well known in the art, as the range of the echo signal increases, its amplitude is diminished. As a result, unless the echo signal emanating from more distant reflectors is amplified more than the echo signal from nearby reflectors, the brightness of the image diminishes rapidly as a function of range (R). This amplification is controlled by the operator who manually sets eight (typically) TGC linear potentiometers 108 to values which provide a relatively uniform brightness over the entire range of the sector scan. The time interval over which the echo signal is acquired determines the range from which it emanates, and this time interval is divided into eight segments by the TGC control circuit 106. The settings of the eight potentiometers are employed to set the gain of the amplifiers 105 during each of the eight respective time intervals so that the echo signal is amplified in ever increasing amounts over the acquisition time interval.

The beam forming section 101 of the receiver 14 includes n=128 separate receiver channels 110. As will be explained in more detail below, each receiver channel 110 receives the analog echo signal from one of the TGC amplifiers 105 at an input 111, and it produces a stream of digitized output values on an I bus 112 and a Q bus 113. Each of these I and Q values represents a sample of the echo signal envelope at a specific range (R). These samples have been delayed and phase shifted such that when they are summed at summing points 114 and 115 with the I and Q samples from each of the other receiver channels 110, they indicate the magnitude and phase of the echo signal reflected from a point P located at range R on the steered beam ($\theta$). In the preferred embodiment, each echo signal is sampled at 150 micrometer increments over the entire range of the scan line (typically 40 to 200 millimeters).

For a more detailed description of the receiver 14, reference is made to U.S. Pat. No. 4,983,970 which issued on Jan. 8, 1991 as is entitled "Method And Apparatus for Digital Phase Array Imaging", and which is incorporated herein by reference.

Referring still to FIG. 3, the mid processor section 102 receives the beam samples from the summing points 114 and 115. The I and Q values of each beam sample is a 20-bit digital number which represents the in-phase and quadrature components of the magnitude of the reflected sound from a point (R,$\theta$). The mid processor 102 can perform a variety of calculations on these beam samples, where choice is determined by the type of image to be reconstructed. For example, if a conventional magnitude image is to be produced, a detection process indicated at 120 is implemented in which a digital magnitude M is calculated from each beam sample and output at 121.

$$M = \sqrt{I^2 + Q^2}$$

The detection process 120 may also implement correction methods such as that disclosed in U.S. Pat. No. 4,835,689, issued May 30, 1989 and entitled "Adaptive Coherent Energy Beam Formation Using Phase Conjugation." Such correction methods examine the received beam samples and calculate corrective values that can be used in subsequent measurements by the transmitter 13 and receiver 14 to improve beam focusing and steering. Such corrections are necessary, for example, to account for the non-homogeneity of the media through which the sound from each transducer element travels during a scan.

The mid processor may also include a Doppler processor 112 such as that described in U.S. Pat. No. 4,217,909 issued on Aug. 19, 1980 and entitled "Directional Detection of Blood Velocities In An Ultrasound System"; or such as that described in U.S. Pat. No. 4,265,126 issued on May 5, 1981 and entitled "Measurement of True Blood Velocity By an Ultrasound System." Such Doppler processors often employ the phase information ($\phi$) contained in each beam sample to determine the velocity of reflecting objects along the direction of the beam (i.e. radial direction from the center of the transducer 11), where $$\phi = \tan^{-1}(I/Q).$$

The mid processor may also include a correlation flow processor 123, such as that described in U.S. Pat. No. 4,587,973, issued May 13, 1986 and entitled "ultrasonic Method and Means For Measuring Blood Flow And The Like Using Autocorrelation." Such methods measure the motion of reflectors by following the shift in their position between successive ultrasonic pulse measurements. If the successive measurements are at the same beam angle ($\theta$), motion of the reflectors along the beam direction is measured, whereas if successive measurements are made at different beam angles ($\theta$), then the cross correlation can measure motion of the reflectors in other directions.

Figure 4:
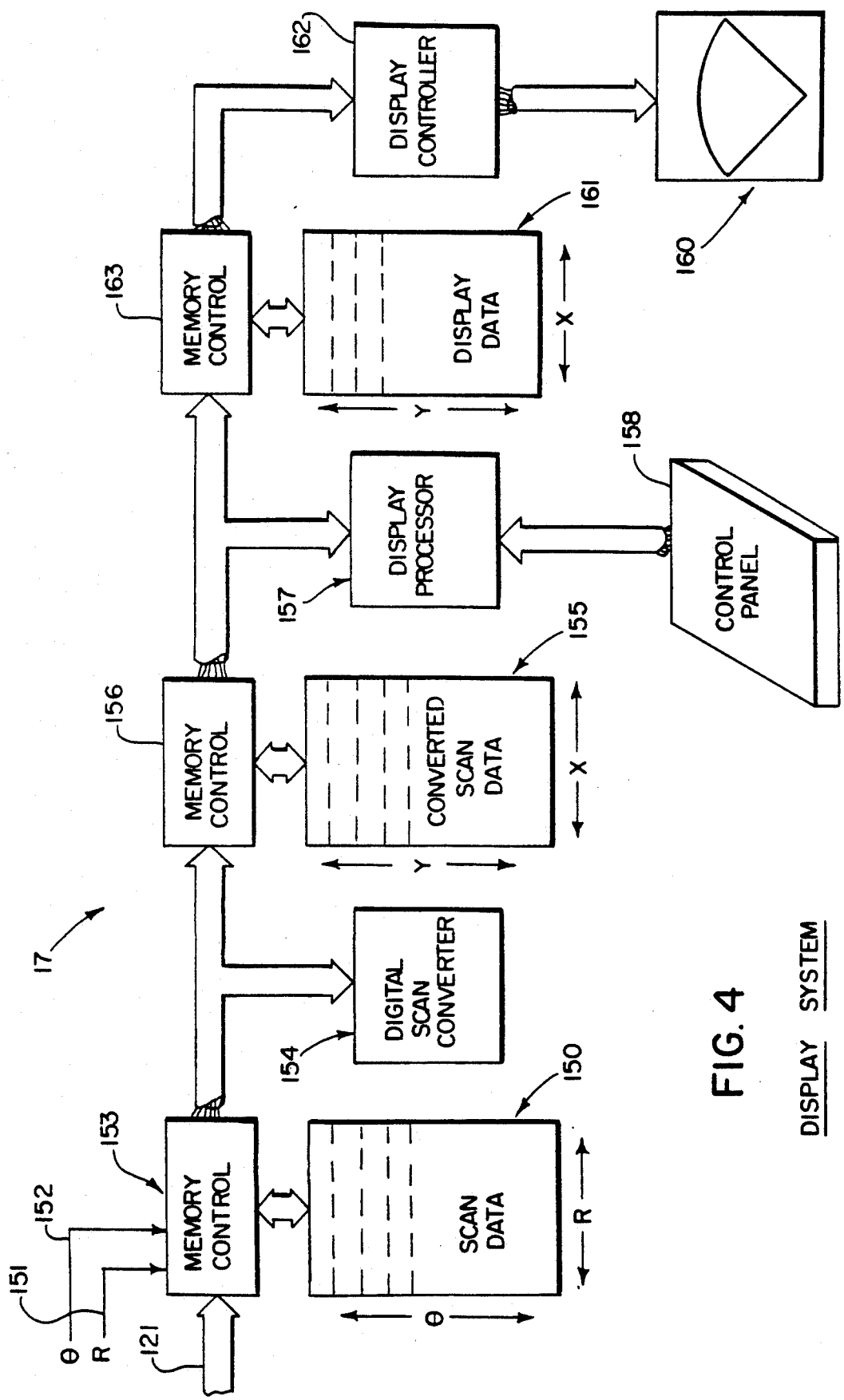
FIG. 4 is a block diagram of a display system which forms part of the system of FIG. 1.

Referring particularly to FIGS. 1 and 4, the receiver 14 generates a stream of 8-bit digital numbers at its output 121 which is applied to the input of the display system 17. This "scan data" is stored in a memory 150 as an array, with the rows of the scan data array 150 corresponding with the respective beam angles ($\theta$) that are acquired, and the columns of the scan data array 150 corresponding with the respective ranges (R) at which samples are acquired along each beam. The R and $\theta$ control signals 151 and 152 from the receiver 14 indicate where each input value is to be stored in the array 150, and a memory control circuit 153 writes that value to the proper memory location in the array 150. The scan can be continuously repeated and the flow of values from the receiver 14 will continuously update the scan data array 150.

Referring still to FIG. 4, the scan data in the array 150 are read by a digital scan converter 154 and converted to a form producing the desired image. If a conventional B-scan image is being produced, for example, the magnitude values M(R,$\theta$) stored in the scan data array 150 are converted to magnitude values M(x,y) which indicate magnitudes at pixel locations (x,y) in the image. Such a polar coordinate to Cartesian coordinate conversion of the ultrasonic image data is described, for example, in an article by Steven C. Leavitt et al in *Hewlett-Packard Journal*, October, 1983, pp. 30-33, entitled "A Scan Conversion Algorithm for Displaying Ultrasound Images."

Regardless of the particular conversion made by the digital scan converter 154, the resulting image data are written to a memory 155 which stores a two-dimensional array of converted scan data. A memory control 156 provides dual port access to the memory 155 such that the digital scan converter 154 can continuously update the values therein with fresh data while a display processor 157 reads the updated data. The display processor 157 is responsive to operator commands received from a control panel 158 to perform conventional image processing functions on the converted scan data 155. For example, the range of brightness levels indicated by the converted scan data 155 may far exceed the brightness range of the display device 160. Indeed, the brightness resolution of the converted scan data 155 may far exceed the brightness resolution of the human eye, and manually operable controls are typically provided which enable the operator to select a window of brightness values over which maximum image contrast is to be achieved. The display processor reads the converted scan data from the memory 155, provides the desired image enhancement, and writes the enhanced brightness values to a display memory 161.

The display memory 161 is shared with a display controller circuit 162 through a memory control circuit 163, and the brightness values therein are mapped to control the brightness of the corresponding pixels in the display 160. The display controller 162 is a commercially available integrated circuit which is designed to operate the particular type of display 160 used. For example, the display 160 may be a CRT, in which case the display controller 162 is a CRT controller chip which provides the required sync pulses for the horizontal and vertical sweep circuits and maps the display data to the CRT at the appropriate time during the sweep.

It should be apparent to those skilled in the art that the display system 17 may take many forms depending on the capability and flexibility of the particular ultrasound system. In the preferred embodiment described above, programmed microprocessors are employed to implement the digital scan converter and display processor functions, and the resulting display system is, therefore, very flexible and powerful.

Figure 5:
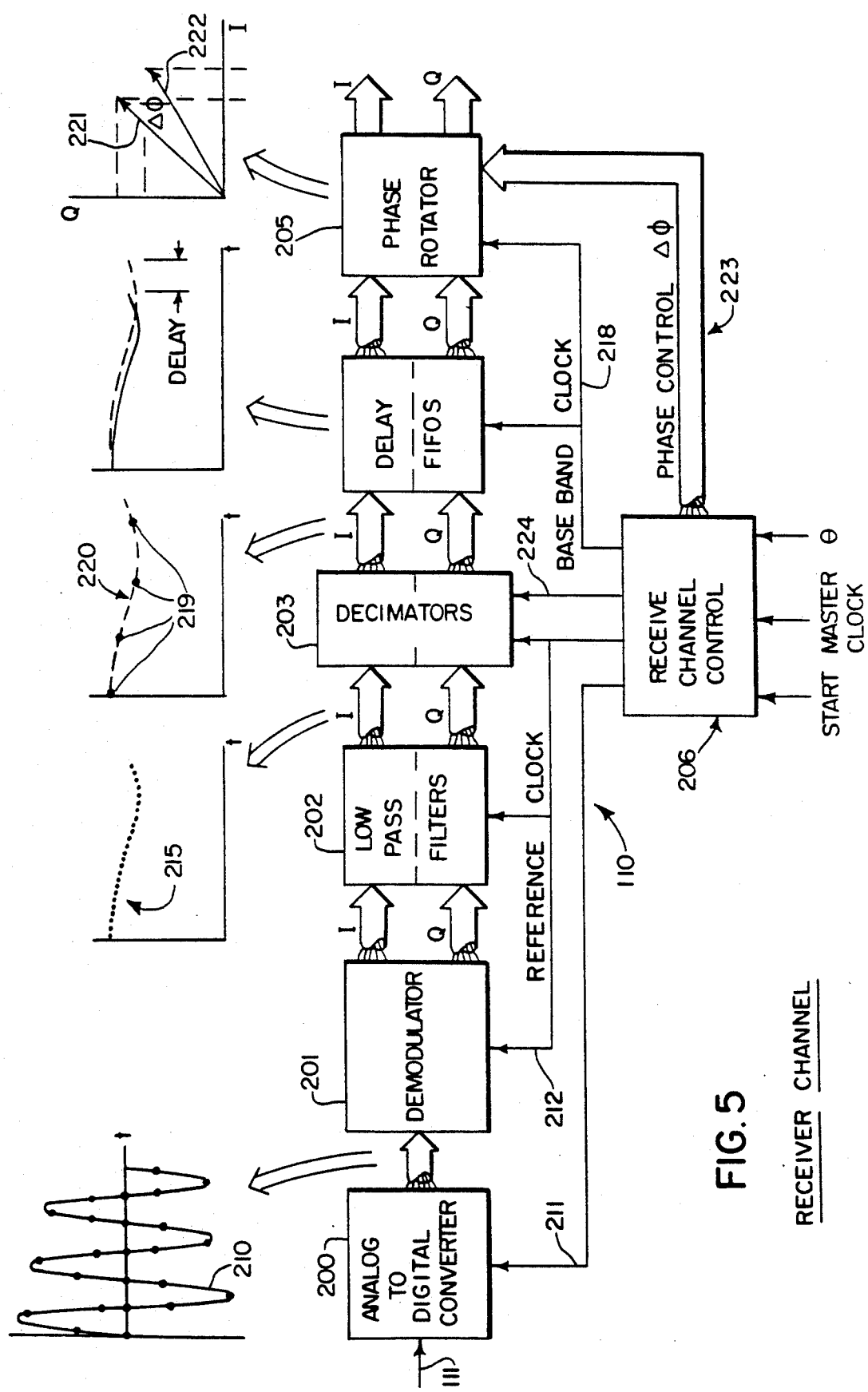
FIG. 5 is a block diagram of a receiver channel which forms part of the receiver of FIG. 3.

As indicated above with reference to FIG. 3, the beam forming section 101 of the receiver 14 is comprised of a set of receiver channels 110—one for each element 12 of the transducer 11. Referring particularly to FIG. 5, each receiver channel is responsive to a START command, a 40 MHz master clock, and a beam angle signal ($\theta$) from the digital controller 16 (FIG. 1) to perform the digital beam forming functions. These include: sampling the analog input signal 111 in an analog-to-digital converter 200, demodulating the sampled signal in a demodulator 201; filtering out the high frequency sum signals produced by the demodulator 201 with low pass filters 202; reducing the data rate in decimators 203; and time delaying and phase adjusting the resulting digital data stream in delay FIFOs 204 and phase rotator 205. All of these elements are controlled by a receive channel control 206 which produces the required clock and control signals in response to the commands from the digital controller 16. In the preferred embodiment all of these elements are contained on a single integrated circuit.

Referring still to FIG. 5, the analog-to-digital converter 200 samples the analog signal indicated graphically at 210 at regular intervals determined by the leading edge of a delayed sample clock signal on line 211. In the preferred embodiment the sample clock 211 is a 40 MHz clock and this enables the use of ultrasonic frequencies up to 20 MHz without violating the Nyquist sampling criteria. When a 5 MHz ultrasonic carrier frequency is employed, for example, it is sampled eight times per carrier cycle and a 10-bit digital sample is produced at the output of the analog-to-digital converter at a 40 MHz rate. These samples are input to the demodulator 201 which mixes each sample with both a reference that is in-phase with the transmitted ultrasonic carrier, and with a reference that is in quadrature with the transmitted ultrasonic carrier. The demodulator reference signals are produced from stored SINE and COSINE tables that are read out of their respective ROM memories by a 40 MHz reference clock on line 212. The SINE value is digitally multiplied by the sampled input signal to produce a demodulated, in-phase value (I) which is output to the low pass filter 202, and the COSINE value is digitally multiplied by the same sampled input signal to produce a demodulated, quadrature phase value Q which is output to a separate low pass filter 202. The low pass filters 202 are finite impulse response filters which are tuned to pass the difference frequencies output by the demodulator 201, but block the higher, sum frequencies. As shown by the graph 215, the output of each low pass filter is, therefore, a 40 MHz stream of digital values which indicate the magnitude of the I or Q component of the echo signal envelope.

For a detailed description of an analog-to-digital converter, demodulator, and a low pass filter circuit reference is made to U.S. Pat. No. 4,839,652 which issued Jun. 13, 1989 and is entitled "Method and Apparatus For High Speed Digital Phased Array Coherent Imaging System."

Referring still to FIG. 5, the rate at which the demodulated I and Q components of the echo signal is sampled is reduced by decimators 203. The 12-bit digital samples are input to the decimators at a 40 MHz rate which is unnecessarily high from an accuracy standpoint, and which is a difficult data rate to maintain throughout the system. Accordingly, the decimators 203 select every eighth digital sample to reduce the data rate down to a 5 MHz rate. This corresponds to the frequency of a base band clock produced on line 218 and employed to operate the remaining elements in the receiver channel. The I and Q outputs of the decimators 203 are thus digitized samples 219 of the echo signal envelope indicated by dashed line 220. The decimation ratio and the base band clock frequency can be changed to values other than 8:1 and 5 MHz.

The echo signal envelope represented by the demodulated and decimated digital samples is then delayed by the delay FIFOs 204 and phase shifted by the phase rotator 205 to provide the desired beam steering and beam focusing. The delay FIFOs 204 are memory devices into which the successive digital sample values are written as they are produced by the decimators 203 at a rate of 5 MHz. These stored values are written into successive memory addresses and they are then read from the memory device and output to the phase rotator 205. The amount of the initial delay is determined by the difference between the memory location from which the digital sample is currently being output and the memory location into which the currently received digital sample is being stored. The 5 MHz base band clock establishes 200 nanosecond intervals between stored digital samples and the FIFOs 204 can, therefore, provide a time delay measured in 200 nanosecond increments up to their maximum of 25.6 microseconds.

The time delay provided by the delay FIFOs 204 is dynamically changed during receipt of the echo signal by advancing the data points sampled by the decimators 203. Each advancement of the sampled data causes the data stream being input to the delay FIFOs 204 to effectively be delayed by an additional 25 nanoseconds (1/40 MHz). A sample advance control line 224 driven by the receive channel control 206 determines when each such advance should occur. As will be described in more detail below, this advancing occurs at calculated points during the reception of the echo signal in accordance with the teachings of the present invention.

The phase rotators 205 enable the digitized representation of the echo signal to be phase rotated. The I and Q digital samples which are input to the phase rotator 205 may be represented by a phasor 221 and the rotated I and Q digital samples output by the phase rotator 205 may be represented by the phasor 222. The magnitude of the phasors (i.e. the vector sum of their I and Q components) are not changed, but the I and Q values are changed with respect to one another such that the output phasor 222 is rotated by an amount $\Delta\phi$ from the input phasor 221. The phase can be either advanced ($+\Delta\phi$) or delayed ($-\Delta\phi$) in response to a phase control signal received on a bus 223 from the receive channel control 206. For a detailed description of the phase rotator 205, reference is made to U.S. Pat. No. 4,896,287 which issued on Jan. 23, 1990 and is entitled "Cordic Complex Multiplier" and is incorporated herein by reference.

For a general description of the receiver channel 110 and a detailed description of how the I and Q outputs of each receiver channel 110 are summed together to form a beam signal, reference is also made to U.S. Pat. No. 4,983,970 which issued on Jan. 8, 1991 and is entitled "Method and Apparatus For Digital Phased Array Imaging" which is incorporated herein by reference.

The improvement provided by the present invention is embodied in the receive channel control 206 which is shown in more detail in FIG. 6. As indicated above, the receive channel control 206 is a discrete logic circuit which is formed on a very large scale integrated circuit along with the other receiver channel elements shown in FIG. 5. Before explaining this circuit, the calculations which it performs will be described.

The time delay and phase rotation imposed on the received signal for one receiver channel is determined from the following equation:

$$T_d = t/2 - \sqrt{(t/2)^2 + (x/c)^2 - (xt/c)\sin(\theta)} \quad (2)$$

where:
t = elapsed time since sound pulse was transmitted from center of transducer array (i.e. START);
c = sound velocity;
$\theta$ = beam angle; and
x = distance of receiver channel transducer element from center of array.

In order to calculate $T_d$ according to this formula in real time, it must be converted to a form which can be solved with integer math. The delay of equation (2) can be rearranged to arrive at the following expression (3):

$$t = ((x/c)^2 - T_d^2)/((x/c)\sin(\theta) - T_d) \quad (3)$$

This equation can be further rearranged as follows:

$$t((x/c)\sin(\theta) - T_d) - (x/c)^2 + T_d^2 = 0 \quad (4)$$

The receive channel control 206 operates by solving equation (4). As time (t) increments in value, the left hand side of equation (4) is calculated using the current time delay value ($T_d$). When the calculated value reaches or exceeds zero, the time delay value $T_d$ is incremented and output to the phase rotator 205 and delay FIFOs 204. This calculation is repeated for each increment of time, and the value of $T_d$ is incremented when necessary and used in subsequent calculations.

To calculate equation (4) with integer math it is necessary to quantize the variables t and $T_d$. In the preferred embodiment the time delay resolution required in $T_d$ to advance the phase rotator 205 one increment is the time necessary to rotate the phase rotator 1/32 of the carrier frequency period:

$$t_\phi = 1/32 \, F_0 \quad (5)$$

The total time delay $T_d$ is then an integral number (p) of these incremental time delays ($t_{100}$):

$$T_d = pt_\phi \quad (6)$$

Similarly, time (t) can be quantized into increments ($\tau$) which are counted:

$$t = n\tau \quad (7)$$

where n is the number of ticks of the $\tau$ clock. In the preferred embodiment a 5 MHz clock is employed to count the $\tau$ time increments and to initiate each calculation of equation (4).

Substituting equation (5), (6) and (7) into equation (4) yields $$n \, 32/L(32F_0(x/c)\sin(\theta) - p) - ((x/c)32 \, F_0)^2 + p^2 = 0 \quad (8)$$

where:
$L = 1/\tau F_0$.

Equation (8) can be rewritten in the following equivalent form:

$$nA - npB - E^2 + p^2 = 0 = D \quad (9)$$

$$\text{where } A = 32/L(32F_0)(x/c)\sin(\theta) \quad (9a)$$

$$B = 32/L \quad (9b)$$

$$E = (x/c) \, 32F_0 \quad (9c)$$

The expression for D in equation (9) is equivalent to equation (4) when D=0. The expression can be given initial values of time (n) and time delay (p) that satisfy D=0 in equation (9) when the reflected wave is to be acquired, and then the process of dynamically focusing the received signal is begun and operates as follows:

(a) incrementing p to reduce the value of D to less than zero, (b) incrementing time (n) and recalculating D to determine if it has reached or exceeded zero, (c) incrementing p when D reaches or exceeds zero, thus reducing D below zero, and outputting total delay $T_d$ to the receiver channel, and (d) repeating step (b) until the entire echo signal has been received.

To increment p in steps (a) and (c) the contribution of p in the current value of D is subtracted and then the contribution of the new value of p (i.e. $p = p+1$) is added to D. This is shown in the following calculation, after which p is incremented:

$$D_{p+1} = D_p - nB + (2p+1) \quad (10)$$

To increment n in step (b), the contribution of n in the current value of D is subtracted and then the contribution of the new value of n (i.e. $n = n+1$) is added to D. This is shown in the following calculation, after which n is incremented:

$$D_{n+1} = D_n + A - pB \quad (11)$$

The function of the receive channel control 206 is to calculate the constants A, B and E in equations (9), calculate initial values of D, p and n, and carry out the process in steps (a), (b), (c) and (d) to produce the phase control signal $\Delta\phi$ as the reflected ultrasonic wave is received.

Referring particularly to FIG. 6, the receive channel control 206 includes a circuit 250 which receives input values $F_0$, x and c and calculates the value of E in equation (9(c)) and stores it in an E register 251. A circuit 252 calculates the value of B in equation (9(b)) using the input L and stores the result in a B register 253. A circuit 254 calculates the constant A in accordance with equation (9(a)) using the inputs $F_0$, x, L, $\theta$ and c, and stores the result in an A register 255. These calculations are performed prior to the transmission of each beam.

Also calculated prior to each beam transmission are the initial values of n and p at which receive data is to be acquired. The time ($n_i \tau$) at which data is to be acquired after the transmission of the beam (START) is calculated by a circuit 257 using the input values x, $\theta$, c, $t_\phi$ and $F_{min}$ according to the following equation (12):

$$n_i = 4F_{min} |x| \cos(\theta)/ct_\phi \quad (12)$$

where:

$F_{min}$ = the optic lense "F number" set by the operator.

This initial value ($n_i$) is stored in an n register 258, and it as well as the input values x, $\theta$, $t_\phi$ are then used by a circuit 260 to calculate an initial value of p according to the following equation:

$$P_i = T_d/t_\phi$$

where $T_d$ is calculated according to equation (2) at time $t = n_i\tau$. The result ($p_i$) is stored in a p register 261. An initial value of D can now be calculated by a circuit 262 which receives as inputs the contents of the registers 251, 253, 255, 258 and 261 and makes the calculation of equation (9). The result is stored in a D register 263. The receive channel control 206 is now ready to process the echo signal from a beam transmitted at the angle $\theta$.

Referring still to FIG. 6, when the beam is transmitted the START signal is applied to a logic sequencer 265, which starts counting the cycles of a 5 MHz input clock ($\tau$). When the number of clock cycles equals the initial value $n_i$ stored in the n register 258, the logic sequencer 265 begins operating the circuit elements to carry out the above described steps (a)–(d). It also enables the A/D converter 200 (FIG. 5) through the control line 211. At this time the value in the p register 261 along with the values in the n register 258, B register 253 and D register 263 are used to calculate a new value of D in accordance with the above equation (10). This is performed in a circuit 267 and the result is restored in the D register 263. This drives the value of D negative and the p register is then incremented ($p = p+1$) and the value of p is employed to calculate a new phase control signal $\Delta\phi = pt_\phi$ in a circuit 268. This new phase control signal is output to the phase rotator 205 (FIG. 5) as described above.

On subsequent ticks of the clock ($\tau$), the value of D is incremented in accordance with the above equation (11). This is accomplished in a circuit 270, which receives inputs from the D register 263, the A register 255, the B register 253 and the p register 261 and which stores the calculated result back in the D register 263. The n register 258 is then incremented ($n = n+1$) and the new value in the D register 263 is applied to a comparator 271 to determine if it has reached or exceeded zero. If it has not, the logic sequencer waits for the next tick of the clock ($\tau$), and repeats the same calculation and comparison. Eventually the value of D reaches or exceeds zero, and when this occurs D is decremented by the circuit 267 as described above, the p register 261 is incremented ($p = p+1$) and a new phase control signal $\Delta\phi$ is output by the circuit 268. This process of updating the value of D as time passes continues until the required number of echo signal samples have been acquired by the receiver.

A circuit identical to that shown in FIG. 6 is provided in the receive channel control 206 to drive the sample advance control line 224. However, in this instance the resolution required in $T_d$ to advance the delay one increment in the decimators 203 is 25 nanoseconds (i.e. 1/40 Mhz sample rate)

$$t_\phi = 25 \times 10^{-9}.$$

The total time delay $T_d$ is then an integral number (p) of these incremental time delays ($t_\phi$) and the values of the constants A, B and E are calculated accordingly. In this case, each time the calculated value of D reached or exceeds zero, D is decremented by the circuit 267 as described above, the p register 261 is incremented ($p = p+1$) and the sample advance control line 224 is pulsed to advance the decimators one sample. The process continues in parallel with the abovedescribed advancement of the phase rotator 205 as the echo signal samples are acquired by the receiver.

While in the preferred embodiment both the phase delay and the time delay of each receive channel 110 is dynamically changed as the echo signal is received, substantial improvement can also be achieved by only dynamically changing the phase delay. In addition, the present invention may also be employed with receiver channels which do not require phase rotators, such as that described in co-pending U.S. patent application Ser. No. 844,031 filed on Mar. 2, 1992 and entitled "Phased Array Ultrasonic Beam Forming Using Oversampled A/D Converters." In this embodiment only the time delay need be dynamically advanced.

I claim:

1. An ultrasonic imaging system which comprises:

an ultrasonic transducer array having a set of array elements disposed in a pattern and each being separately operable to produce a pulse of ultrasonic energy during a transmission mode and each being operable to produce an echo signal in response to ultrasonic energy which impinges on the array element during a receive mode;

a transmitter connected to the ultrasonic transducer array and being operable during the transmission mode to apply a separate signal to each array element such that a steered transmit beam is produced;

a receiver connected to the ultrasonic transducer array and being operable during the receive mode to sample the echo signal produced by each array element as the ultrasonic energy impinges thereon and to form a receive beam signal therefrom by separately delaying and summing the separate echo signals sampled from each transducer element;

a display system connected to receive the receive beam signal and produce an image therefrom; and in which the receiver has a separate channel for each array element that operates to impart said delay on the echo signal sample by calculating a value (D) according to the expression:

$$D = nA - npB - E^2 + p^2$$

where n is the number of time increments since the production of said steered transmit beam, p is the number of delay increments applied to the echo signal sample, and A, B and E are values which remain constant during the reception of the echo signals produced as a result of said steered transmit beam; and the value of D is changed as a function of time increments (n) and the value of D is periodically compared to a preestablished value, and the value of p is changed when the value of D exceeds said preestablished value.

2. The ultrasonic imaging system as recited in claim 1 in which each receiver channel includes means for increasing the value of D after each increment of time passes in accordance with the following expression:

$$D_{n-1} = D_n + A - pB.$$

3. The ultrasonic imaging system as recited in claim 1 in which each receiver channel includes means for changing the value of D each time the value of p changes in accordance with the following expression:

$$D_{p+1} = D_p - nB + (2p+1).$$

4. The ultrasonic imaging system as recited in claim 1 in which each receiver channel includes a phase rotator which imparts a phase delay to the echo signal samples and the amount of such phase delay is incremented each time the value of D exceeds said preestablished value.

5. An ultrasonic imaging system which comprises:

an ultrasonic transducer array having a set of array elements disposed in a pattern and each being separately operable to produce a pulse of ultrasonic energy during a transmission mode and each being operable to produce an echo signal in response to ultrasonic energy which impinges on the array element during a receive mode;

a transmitter connected to the ultrasonic transducer array and being operable during the transmission mode to apply a separate signal to each array element such that a steered transmit beam is produced;

a receiver connected to the ultrasonic transducer array and being operable during the receive mode to sample the echo signal produced by each array element as the ultrasonic energy impinges thereon and to form a receive beam signal therefrom by separately rotating the phase of the separate echo signals sampled from each transducer element and summing them together;

a display system connected to receive the receive beam signal and produce an image therefrom; and in which the receiver has a separate channel for each array element that operates to impart said phase rotation on the echo signal sample by calculating a value (D) according to the expression:

$$D = nA - npB - E^2 + p^2$$

where n is the number of time increments since the production of said steered transmit beam, p is the number of phase rotation increments applied to the echo signal sample, and A, B and E are values which remain constant during the reception of the echo signals produced as a result of said steered transmit beam; and the value of D is changed as a function of time increments (n) and the value of D is periodically compared to a preestablished value, and the value of p is changed and when the value of D exceeds said preestablished value.

6. The ultrasonic imaging system as recited in claim 5 in which each receiver channel includes means for increasing the value of D after each increment of time passes in accordance with the following expression:

$$D_{n+1} = D_n + A - pB.$$

7. The ultrasonic imaging system as recited in claim 5 in which each receiver channel includes means for changing the value of D each time the value of p changes in accordance with the following expression:

$$D_{p+1} \cdot D_p - nB + (2p+1)$$

* * * * *